United States Patent
Lin et al.

(10) Patent No.: US 8,237,897 B2
(45) Date of Patent: Aug. 7, 2012

(54) TRANSFLECTIVE LIQUID CRYSTAL DISPLAY

(75) Inventors: Chih-Lung Lin, Miao-Li (TW); Rui-Jie Hsiang, Miao-Li (TW); Ying-Ling Chen, Miao-Li (TW); I-An Yao, Miao-Li (TW); Wei-Yi Ling, Miao-Li (TW); Chueh-Ju Chen, Miao-Li (TW)

(73) Assignee: Chimei InnoLux Corporation, Miaoli County (TW)

( * ) Notice: Subject to any disclaimer, the term of this patent is extended or adjusted under 35 U.S.C. 154(b) by 587 days.

(21) Appl. No.: 12/454,872

(22) Filed: May 26, 2009

(65) Prior Publication Data

US 2009/0290107 A1 Nov. 26, 2009

(30) Foreign Application Priority Data

May 23, 2008 (TW) ................................ 97119119 A

(51) Int. Cl.
*G02F 1/1335* (2006.01)

(52) U.S. Cl. ........................................................ 349/114
(58) Field of Classification Search .................. None
See application file for complete search history.

(56) References Cited

U.S. PATENT DOCUMENTS

| 7,030,946 B2 | 4/2006 | Iijima et al. | |
|---|---|---|---|
| 2006/0132682 A1* | 6/2006 | Yang et al. | 349/114 |
| 2006/0187386 A1* | 8/2006 | Roh | 349/114 |
| 2009/0040432 A1* | 2/2009 | Lu et al. | 349/68 |

FOREIGN PATENT DOCUMENTS

CN 1288480 C 12/2006

* cited by examiner

*Primary Examiner* — Hemang Sanghavi
(74) *Attorney, Agent, or Firm* — Li & Cai Intellectual Property (USA) Office

(57) ABSTRACT

A transflective liquid crystal display (LCD) includes a plurality of pixel regions. Each pixel region includes a transparent electrode receiving a gray voltage and a plurality of electrically floating reflectors. The transparent electrode includes a plurality of openings corresponding to the reflectors. The reflectors are disposed on the corresponding openings.

19 Claims, 2 Drawing Sheets

TRANSFLECTIVE LIQUID CRYSTAL DISPLAY

BACKGROUND

1. Technical Field

The present disclosure relates to a transflective liquid crystal display (LCD), and more particularly to a transflective LCD with a pixel region having a plurality of electrically floating reflectors and a transparent electrode having a plurality of openings corresponding to the reflectors.

2. Description of Related Art

Because LCDs have the advantages of portability, low power consumption, and low radiation, they are widely used in portable devices such as notebooks, personal digital assistants (PDAs), video cameras, and others. LCDs can utilize transparent, reflective, and transflective display technologies.

A transflective LCD uses both a backlight and an external light as a source of illumination at the same time. Each pixel region can be divided into a transparent region and a reflective region. The transparent region has a transparent electrode that facilitates the passage of backlight and the reflective region has a reflective electrode capable of reflecting light from external light sources.

However, in a single cell gap transflective LCD, a thickness of a liquid crystal layer of the transparent region is the same as that of the reflective region. Light from the backlight passes through the liquid crystal layer once and light from the external light source passes through the liquid crystal layer twice, such that an optical phase difference of the light through the transparent region is less than that of the light through the reflective region. As a result, a gray level of the transparent region exceeds that of the reflective region, and the image quality of this transflective LCD is liable to be unsatisfactory.

What is needed is a transflective LCD that can overcome the described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
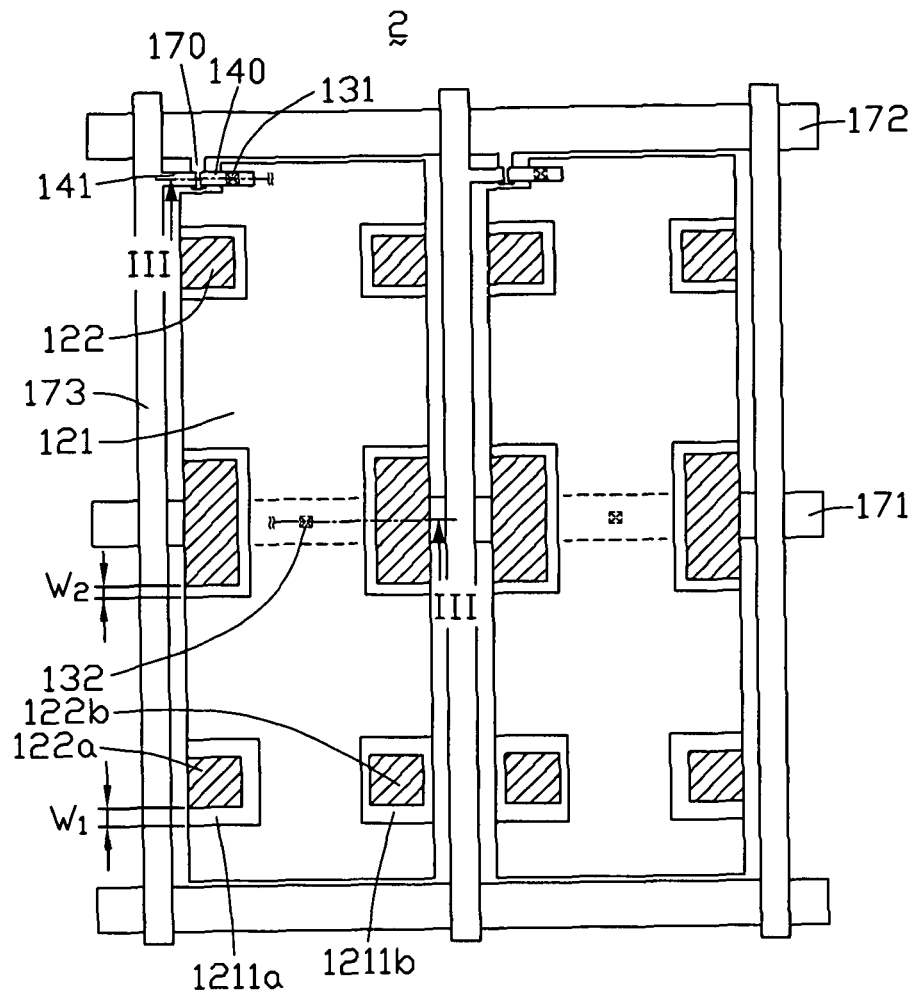
FIG. 1 is a top view of part of a first embodiment of a transflective LCD according to the present disclosure.
Figure 2:
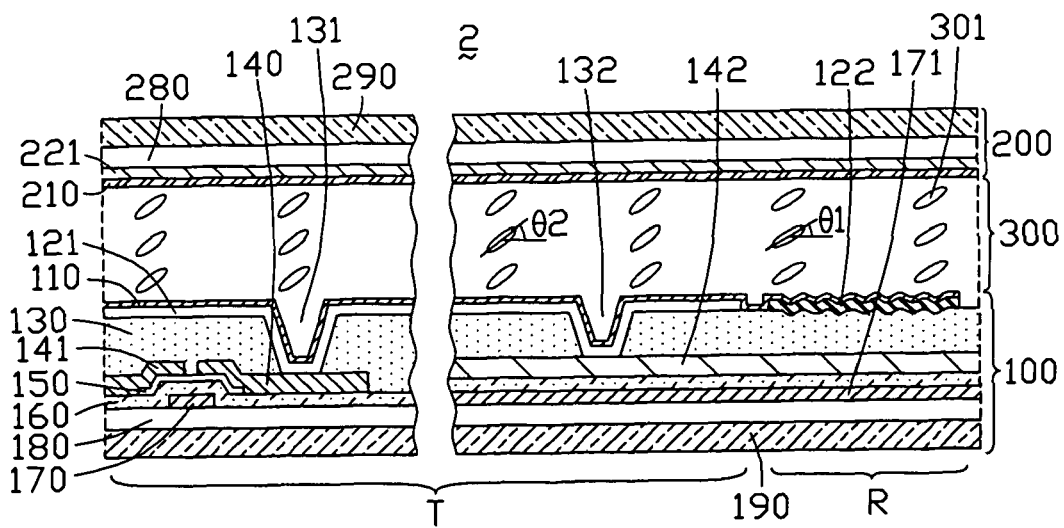
FIG. 2 is a cross section of the transflective LCD of FIG. 1 along line III-III.

FIG. 1 is a top view of part of a first embodiment of a transflective LCD 2 according to the present disclosure, and FIG. 2 is a cross section of the transflective LCD 2 of FIG. 1 along line III-III. The transflective LCD 2 includes a thin film transistor (TFT) substrate 100, a color filter (CF) substrate 200, and a liquid crystal layer 300. The TFT substrate 100 and the CF substrate 200 are disposed opposite to each other and spaced apart by a predetermined distance. The liquid crystal layer 300 is interposed between the TFT substrate 100 and the CF substrate 200. The liquid crystal layer 300 includes a plurality of liquid crystal molecules 301.

The TFT substrate 100 includes a first base plate 180, a first polarizer 190, a plurality of gate lines 172, a plurality of gate electrodes 170, a plurality of common lines 171, a first insulating layer 160, a semi-conductor layer 150, a plurality of data lines 173, a plurality of source electrodes 141 and drain electrodes 140, a plurality of storage capacitor electrodes 142, a second insulating layer 130, a plurality of transparent electrodes 121, a plurality of reflectors 122, and a first alignment layer 110.

The first polarizer 190 is disposed away from the liquid crystal layer 300 of the first base plate 180. The gate lines 172, the gate electrodes 170, and the common lines 171 are disposed on a surface adjacent to the liquid crystal layer 300 of the first base plate 180. The first insulating layer 160 covers the gate lines 172, the gate electrodes 170, the common lines 171, and part of the first base plate 180. The semi-conductor layer 150, and the storage capacitor electrodes 142 are disposed on the first insulating layer 160. The data lines 173, the source electrodes 141, and the drain electrodes 140 cover part of the semi-conductor layer 150 and the first insulating layer 160. The second insulating layer 130 covers the semi-conductor layer 150, the data lines 173, the source electrodes 141, the drain electrodes 140, and the storage capacitor electrodes 142. The transparent electrodes 121 and the reflectors 122 are disposed on the second insulating layer 130 respectively. The alignment layer 110 covers the transparent electrodes 121, the reflectors 122 and part of the second insulating layer 130.

The gate lines 172 are parallel and each extend along a first axis. The common lines 171 are parallel to the gate lines 172, and each common line 171 is located between two adjacent gate lines 172. The data lines 173 are parallel and each extend along a second axis orthogonal to the first direction. The gate electrodes 170, the source electrodes 141, the drain electrodes 140, and the semi-conductor layer 150 form a plurality of TFTs.

Each TFT is located at the vicinity of a respective point of intersection of the gate lines 172 and the data lines 173. The gate electrode 170 is connected to the corresponding gate line 172. The source electrode 141 is connected to the corresponding data line 173. The drain electrode 140 is connected to the corresponding transparent electrode 121 via a first contact hole 131 in the second insulating layer 130. The transparent electrode 121 is connected to the storage capacitor electrode 142 via a second contact hole 132 in the second insulating layer 130. The reflectors 122 are electrically floating, receiving no signal. The transparent electrode 121 can be indium tin oxide (ITO) or indium zinc oxide (IZO). The reflector 122 can be metal with a high reflectivity, such as aluminium (Al) or argentine (Ag).

The crossed gate lines 172 and data lines 173 define an array of pixel regions (not labeled) of the transflective LCD 2. Each pixel region includes a TFT, a transparent electrode 121, a plurality of reflectors 122, and part of a storage capacitor electrode 142 overlapping with the corresponding common line 171. The transparent electrode 121 includes a plurality of openings 1211 corresponding to the reflectors 122 respectively. The openings 1211 have elongated shapes and different areas, and are symmetrically disposed at two sides of the transparent electrode 121 adjacent to two corresponding data lines 173. The reflectors 122 have elongated shapes and different areas. An area of the reflector 122 is slightly less than an area of the corresponding opening 1211, and the reflector 122 is located within the corresponding opening 1211. For example, an area of the reflector 122a is slightly less than an area of the corresponding opening 1211a, and the reflector 122a is located within the corresponding opening 1211a. The reflectors 122 do not overlap the transparent electrode 121, and at least one reflector 122 overlaps part of the storage capacitor electrode 142. A first distance W1 between one reflector 122 and the transparent electrode 121 is different from a second distance W2 between one of other reflectors 122 and the transparent electrode 121. Two reflectors 122 are located at two different positions of two corresponding openings 1211, for example: the reflector 122a is located away from the center of the corresponding opening 1211a, and the reflector 122b is located at the center of the corresponding opening 1211b.

The CF substrate 200 includes a second base plate 280, a second polarizer 290, a common electrode 221, and a second alignment layer 210. The second polarizer is disposed away from the liquid crystal layer 300 of the second base plate 280. The common electrode 221 is disposed on a surface adjacent to the liquid crystal layer 300 of the second base plate 280. The second alignment layer 210 is interposed between the common electrode 221 and the liquid crystal layer 300.

A region corresponding to the transparent electrode 121 is defined as a transparent region T, and a region corresponding to the reflector 122 is defined as a reflective region R. In operation, a gray voltage is provided to the transparent electrode 121 via the corresponding data line 173 and the TFT. Due to the reflector 122 being electrically floating, the electric field of the reflective region R is less than that of the transparent region T. The liquid crystal molecules 301 of the reflective region R are oriented at a first oblique angle $\theta 1$, and the liquid crystal molecules 301 of the transparent region T are oriented at a second oblique angle $\theta 2$ greater than the first oblique angle $\theta 1$. For example, when the first oblique angle is 45°, the second oblique angle $\theta 2$ may be 60°. Thus, an optical phase difference of the light through the reflective region R is approximately the same as that of the light through the transparent region T. As a result, a gray level of the reflective region R is approximately the same as that of transparent region T, and the image quality of this transflective LCD 2 is improved.

Moreover, due to the openings 1211 in one transparent electrode 121 having different areas, electric fields are different in the reflective regions R. Thus, the oblique angles of the liquid crystal molecules 301 of the reflective regions R are different, and the viewing angle of the transflective LCD is increased.

Figure 3:
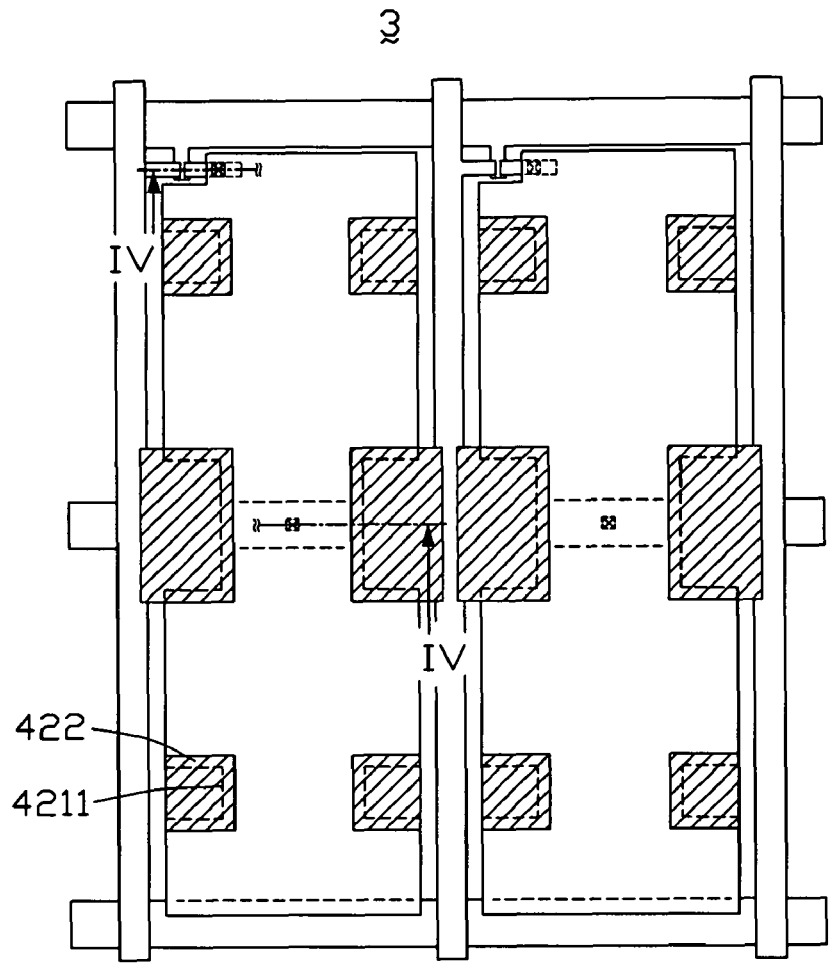
FIG. 3 is a top view of part of a second embodiment of a transflective LCD according to the present disclosure.
Figure 4:
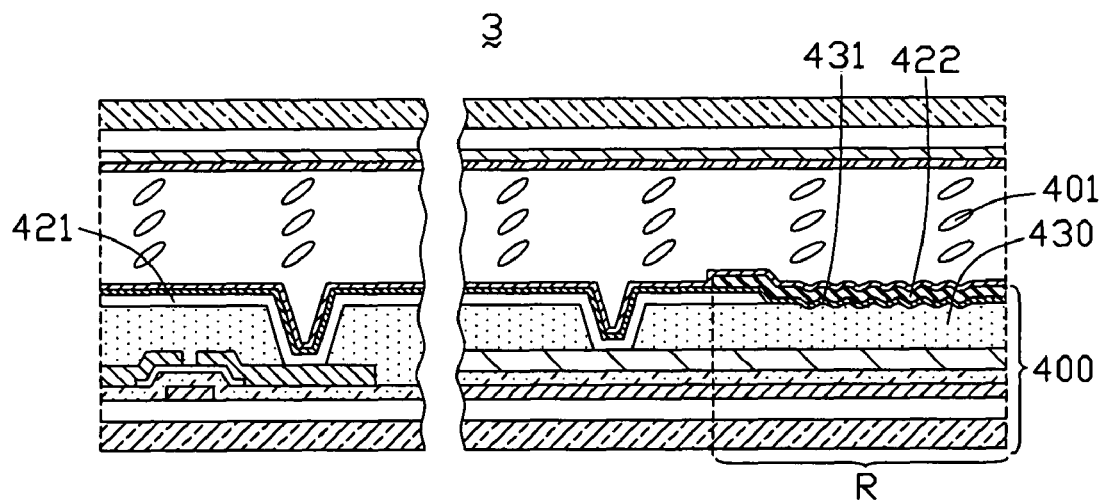
FIG. 4 is a cross section of the transflective LCD of FIG. 3 along line IV-IV.

FIG. 3 is a top view of part of a second embodiment of a transflective LCD 3 according to the present disclosure, and FIG. 4 is a cross section of the transflective LCD 3 of FIG. 3 along line IV-IV. The transflective liquid crystal display 3 differs from the transflective liquid crystal display 2 in that a first substrate 400 further includes a third insulating layer 431 covering transparent electrodes 421 and part of a second insulating layer 430, and reflectors 422 are disposed on the third insulating layer 431 overlapping edges of the transparent electrodes 421. In each pixel region, an area of the reflector 422 is slightly greater than that of a corresponding opening 4211 of the transparent electrode 421, such that the reflector 422 completely covers the corresponding opening 4211.

Due to the reflectors 422 overlapping edges of the transparent electrodes 421, areas of reflective regions R can be enlarged and oblique angles of the liquid crystal molecules 401 of the reflective region R increased. Thus, the viewing angle of the transflective LCD 3 is further increased.

It is to be understood, however, that even though numerous characteristics and advantages of the present embodiments have been set out in the foregoing description, together with details of the structures and functions of the embodiments, the invention is illustrative only; and that changes may be made in detail, especially in matters of arrangement of parts within the principles of the invention to the full extent indicated by the broad general meaning of the terms in which the appended claims are expressed.

What is claimed is:

1. A transflective liquid crystal display (LCD), comprising:
   a plurality of parallel gate lines;
   a plurality of data lines perpendicular to the gate line;
   a plurality of pixel regions defined by the plurality of gate lines and the plurality of data lines, each pixel region comprising a transparent electrode receiving a gray voltage and a plurality of reflectors which are electrically floating, a plurality of openings defined in the transparent electrode and not covered by the transparent electrode, the plurality of openings corresponding to the plurality of reflectors respectively, wherein an area of each of the plurality of reflectors is less than an area of the corresponding opening, each of the plurality of reflectors is entirely located within the corresponding opening and comprises a pre-determined distance between each of the plurality of reflectors and the transparent electrode,
   wherein, in each pixel region, the shortest distance between a first reflector of the plurality of reflectors and the transparent electrode is different from the shortest distance between a second reflector of the plurality of reflectors and the transparent electrode.

2. The transflective LCD of claim 1, wherein each pixel region further comprises a storage capacitor electrode partially overlapping at least one reflector.

3. The transflective LCD of claim 1, wherein at least two electrically floating reflectors have different areas.

4. The transflective LCD of claim 1, wherein at least two openings have different areas.

5. The transflective LCD of claim 1, wherein the first reflector and the second reflector are located at two different positions of two corresponding openings, respectively.

6. The transflective LCD of claim 1, wherein the plurality of openings are divided into a first group of the openings and a second group of the openings, and the first group of the openings are symmetrical with the second group of the openings about an axis parallel to the data lines.

7. The transflective LCD of claim 6, wherein each group of the openings comprises three openings disposed at one sides of the transparent electrode, and the three openings of each group of the openings are aligned with a straight line parallel to the data line.

8. The transflective LCD of claim 7, wherein an area of the middle opening of the three openings is greater than an area of each of the rest two openings of the three openings.

9. The transflective LCD of claim 8, wherein each of the plurality of openings has an elongated shape and each of the plurality of openings has an elongated shape.

10. A transflective liquid crystal display (LCD), comprising:
    a first substrate comprising:
      a plurality of parallel gate lines,
      a plurality of data lines perpendicular to the gate lines
      a plurality of thin film transistors (TFTs) located at the vicinities of respective points of intersection of the gate lines and the data lines respectively,
      a plurality of transparent electrodes connected to the TFTs respectively, a plurality of openings defined in each of the transparent electrodes and not covered by the each of the transparent electrodes,
      a plurality of electrically floating reflectors corresponding to the plurality of openings respectively, a second substrate, and
a liquid crystal layer interposed between the first and second substrates,
wherein an area of each of the plurality of reflectors is less than an area of the corresponding opening, each of the plurality of reflectors is entirely located within the corresponding opening and comprises a pre-determined distance between each of the plurality of reflectors and an adjacent transparent electrode, and the shortest distance between a first reflector of the plurality of reflectors and the adjacent transparent electrode is different from the shortest distance between a second reflector of the plurality of reflectors and the adjacent transparent electrode.

11. The transflective LCD of claim 10, wherein at least two electrically floating reflectors have different areas and at least two openings have different areas.

12. The transflective LCD of claim 10, wherein the first reflector and the second reflector are located at two different positions of two corresponding openings, respectively.

13. The transflective LCD of claim 10, wherein the plurality of openings defined in each of the transparent electrodes are divided into a first group of the openings and a second group of the openings, and the first group of the openings are symmetrical with the second group of the openings about an axis parallel to the data lines.

14. The transflective LCD of claim 13, wherein each group of the openings comprises three openings disposed at one sides of the transparent electrode, and the three openings of each group of the openings are aligned with a straight line parallel to the data line.

15. The transflective LCD of claim 14, wherein an area of the middle opening of the three openings is greater than an area of each of the rest two openings of the three openings.

16. A transflective liquid crystal display (LCD), comprising:
a plurality of gate lines;
a plurality of data lines insulatingly intercrossing the gate line, thereby defining a plurality of pixel regions; a first pixel region of the plurality of pixel regions comprising a plurality of reflectors which are electrically floating, a transparent electrode receiving a gray voltage, and a plurality of openings defined in the transparent electrode and not covered by the transparent electrode, the plurality of openings corresponding to the plurality of reflectors respectively,
wherein an area of each of the plurality of reflectors is less than an area of the corresponding opening, each of the plurality of reflectors is entirely located within the corresponding opening and comprises a pre-determined distance between each of the plurality of reflectors and the transparent electrode,
wherein the shortest distance between a first reflector of the plurality of reflectors and the transparent electrode is different from the shortest distance between a second reflector of the plurality of reflectors and the transparent electrode.

17. The transflective LCD of claim 16, wherein the plurality of openings are divided into a first group of the openings and a second group of the openings, the first reflector and the second reflector are entirely located within two openings of the first group of the opening respectively, and the first group of the openings are symmetrical with the second group of the openings about an axis parallel to the data lines.

18. The transflective LCD of claim 17, wherein each group of the openings comprises three openings disposed at one sides of the transparent electrode adjacent to a corresponding data line, and the three openings of each group of the openings are aligned with a straight line parallel to the data lines.

19. The transflective LCD of claim 18, wherein an area of the middle opening of the three openings is greater than an area of each of the rest two openings of the three openings.

* * * * *